(12) United States Patent
Asati et al.

(10) Patent No.: US 8,599,842 B2
(45) Date of Patent: *Dec. 3, 2013

(54) TRANSFERRING DOCSIS FRAMES USING A LABEL SWITCHING NETWORK

(75) Inventors: Rajiv Asati, Morrisville, NC (US); John Chapman, Saratoga, CA (US); James Neil Guichard, New Boston, NH (US); Luca Martini, Lakewood, CO (US)

(73) Assignee: Cisco Technology, Inc., San Jose, CA (US)

( * ) Notice: Subject to any disclaimer, the term of this patent is extended or adjusted under 35 U.S.C. 154(b) by 1099 days.

This patent is subject to a terminal disclaimer.

(21) Appl. No.: 12/571,024

(22) Filed: Sep. 30, 2009

(65) Prior Publication Data

US 2010/0014538 A1 Jan. 21, 2010

Related U.S. Application Data

(63) Continuation of application No. 11/776,200, filed on Jul. 11, 2007, now Pat. No. 7,773,594.

(51) Int. Cl.
*H04L 12/28* (2006.01)

(52) U.S. Cl.
USPC .................................... 370/389; 370/395.5

(58) Field of Classification Search
USPC .............. 370/389, 401, 291, 392, 373, 395.2, 370/377, 384, 386, 396, 395.5, 352
See application file for complete search history.

(56) References Cited

U.S. PATENT DOCUMENTS 7,773,594 B2 * 8/2010 Asati et al. .................... 370/389

OTHER PUBLICATIONS

Stolowitz Ford Cowger LLP, Listing of Related Cases, Oct. 14, 2011.

* cited by examiner

*Primary Examiner* — Brenda H Pham
(74) *Attorney, Agent, or Firm* — Leon R. Turkevich

(57) ABSTRACT

In one embodiment, label distribution sessions are established between a Modular Cable Modem Termination System (M-CMTS) core and one or more remote PHYs. The label distribution sessions facilitate association of labels with either Radio Frequency (RF) channels or groups of the RF channels that extend from the remote PHYs to one or more cable modems. The labels are then used to facilitate communications between the M-CMTS core and the remote PHYs over a MultiProtocol Label Switching (MPLS) network.

18 Claims, 8 Drawing Sheets

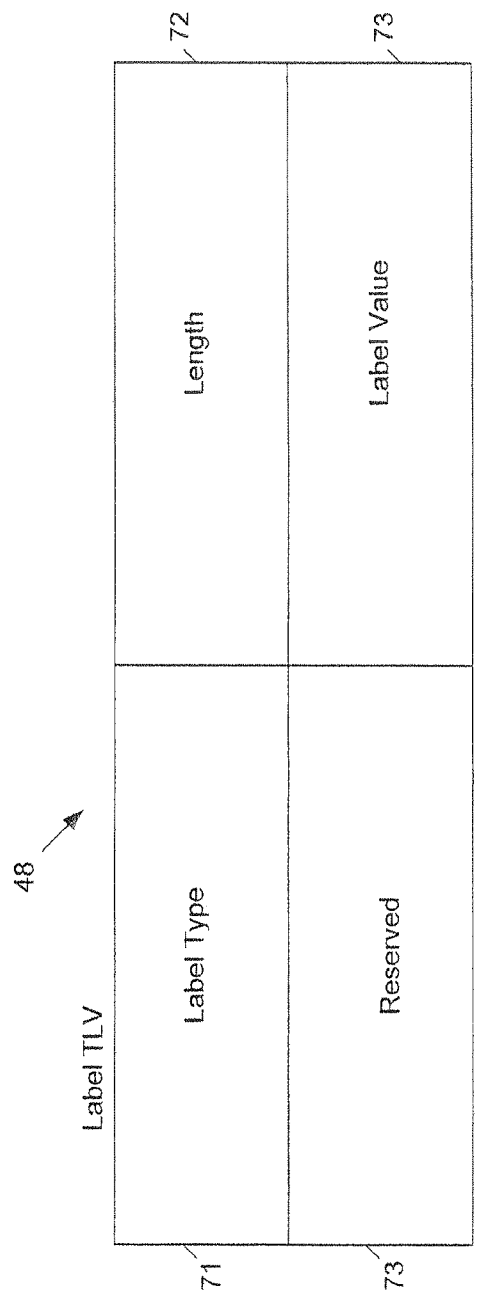

TRANSFERRING DOCSIS FRAMES USING A LABEL SWITCHING NETWORK

CROSS REFERENCE TO RELATED APPLICATIONS

This application is a continuation of U.S. non-provisional patent application Ser. No. 11/776,200 filed Jul. 11, 2007.

TECHNICAL FIELD

The present disclosure relates generally to the field of cable networks.

BACKGROUND

Cable operators have widely deployed high-speed data services on cable television systems. These data services include a cable modem that allows a computer to communicate over an ordinary cable TV network Hybrid Fiber Coax (HFC) cable. A Cable Modem Termination System (CMTS) connects the cable TV network to a data network, such as the Internet. The Data Over Cable Service Interface Specification (DOCSIS) is one of the cable modem standards used for transferring data over the cable TV network.

Modular CMTSs (M-CMTSs) have been developed to improve scaling and for other reasons. These modular systems typically include an M-CMTS core device implementing a subset of DOCSIS protocol (such as Media Access Control (MAC) layer etc.) and one or more remote PHYs such as an Edge Quadrature Amplitude Modulation (EQAM) implementing the remaining subset of DOCSIS protocol (such as the PHYsical layer (PHY), etc.). These remote PHYs generally include modulation devices for modulating downstream traffic to the cable modems or demodulation devices for demodulating upstream traffic from the cable modems. The M-CMTS core and the remote PHYs may communicate over a Downstream External Physical Interface (DEPI).

These M-CMTS cores and remote PHYs generally communicate with each other over an Internet Protocol (IP) or Ethernet network. Such networks have limited mechanisms for guaranteeing Quality of Service (QoS) or reserving bandwidth. These limitations become a problem, particularly when the networks either approach or surpass full bandwidth capacity. The disclosure that follows solves these and other problems.

BRIEF DESCRIPTION OF THE DRAWINGS

FIG. 2C illustrates an example of a Label TLV field that may be included in the label mapping message illustrated in FIG. 2A.

DESCRIPTION OF EXAMPLE EMBODIMENTS

Overview

Figure 1A:
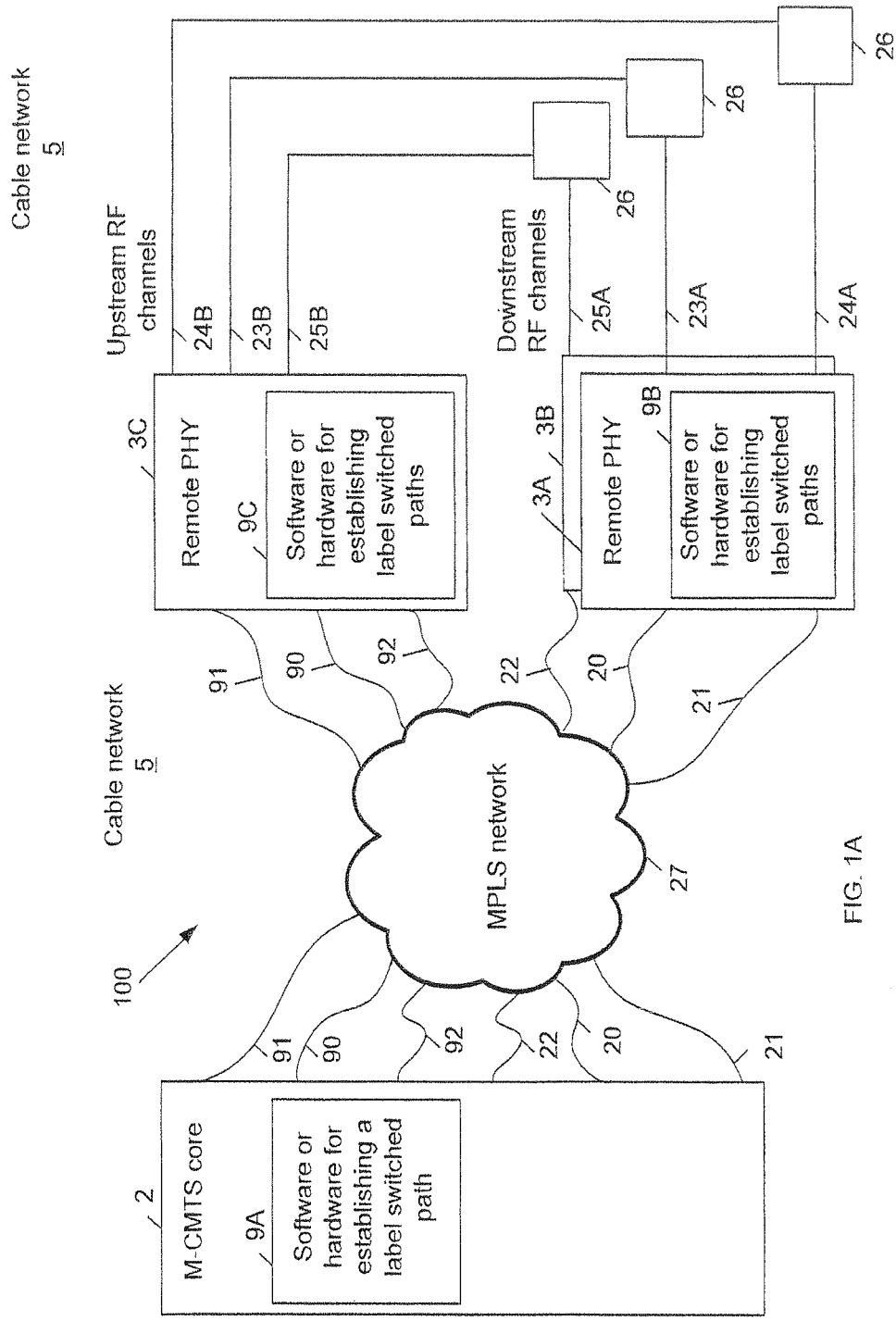
FIG. 1A illustrates an example system for transferring information between a Modular Cable Modem Termination System (M-CMTS) core and remote PHYs over a MultiProtocol Label Switching (MPLS) network.

In one embodiment, label distribution sessions are established between a Modular Cable Modem Termination System (M-CMTS) core and one or more remote PHYs. The label distribution sessions facilitate association of labels with either Radio Frequency (RF) channels or groups of the RF channels that extend from the remote PHYs to one or more cable modems. The labels are then used to facilitate communications between the M-CMTS core and the remote PHYs over a MultiProtocol Label Switching (MPLS) network.

Description

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

FIG. 1A illustrates an example system for transferring information between a Modular Cable Modem Termination System (M-CMTS) core and remote PHYs over a MultiProtocol Label Switching (MPLS) network.

The system 100 includes remote PHYs 3A, 3B and 3C, which serve as an interface between the M-CMTS core 2 and the cable modems 26. It should be apparent that each of the remote PHYs 3A, 3B and 3C include a first interface for a packet switched portion of the cable network and a second different interface for sending the modulated signals to the cable modems 26. Although only three remote PHYs 3A, 3B and 3C are shown in this example, each servicing a small number of the cable modems 26, it will be apparent to one skilled in the art that in actual systems there are more remote PHYs each servicing much larger groups of the cable modems 26. The M-CMTS core 2 and the remote PHYs 3A, 3B and 3C include software or hardware 9A, 9B and 9C for establishing Label Switched Paths (LSPs).

A brief overview of the system 100 follows with reference to FIG. 1A before a more detailed downstream example is described with reference to FIG. 1B. Referring still to FIG. 1A, the LSPs 20, 21 and 22 are established through a Multi-Protocol Label Switching (MPLS) network 27 according to the software or hardware 9A and 9B. Similarly, the LSPs 90, 91 and 92 are established through MPLS network 27 according to the software or hardware 9A and 9C. In association with establishing these LSPs 20-22 and 90-92, the M-CMTS core 2 and the remote PHYs 3A, 3B and 3C each format local forwarding tables that will be used for forwarding traffic.

After the LSPs 20, 21 and 22 are established and the forwarding tables formatted, the M-CMTS core 2 uses its local forwarding table to apply labels to traffic arriving from the Internet (or another data network) for forwarding across the MPLS network 27. The remote PHYs 3A and 3B then compare the labels of the forwarded MPLS traffic arriving over one of the LSPs 20, 21 and 22 to their local forwarding tables to direct traffic to a correct one of the RF channels 23A, 24A and 25A so that the traffic arrives at a correct one of the cable modems 26 for modulation and forwarding to a destination endpoint. The remote PHY 3C and the M-CMTS core 2 can send upstream traffic originating from the cable modems 26 in a similar fashion.

The LSPs 20-22 and 90-92, which may be implemented as DOCSIS pseudowires or other logical connections, allow improved management of network resources in the cable network 5. For example, the M-CMTS core 2 or another network device can cause one of the pseudowire-to-RF channel associations in the forwarding tables to be replaced with a new pseudowire-to-RF channel association. Such an action would result in more cable network resources being allocated towards one group of the cable modems 26 and away from another group of the cable modems 26. This ability to reallocate resources gives a service provider the ability to meet QoS guarantees and to reserve bandwidth for particular subscribers. Other advantages relating to bandwidth management and QoS guarantees are provided by the system 100, as would be apparent to one of skill in the art.

Figure 1B:
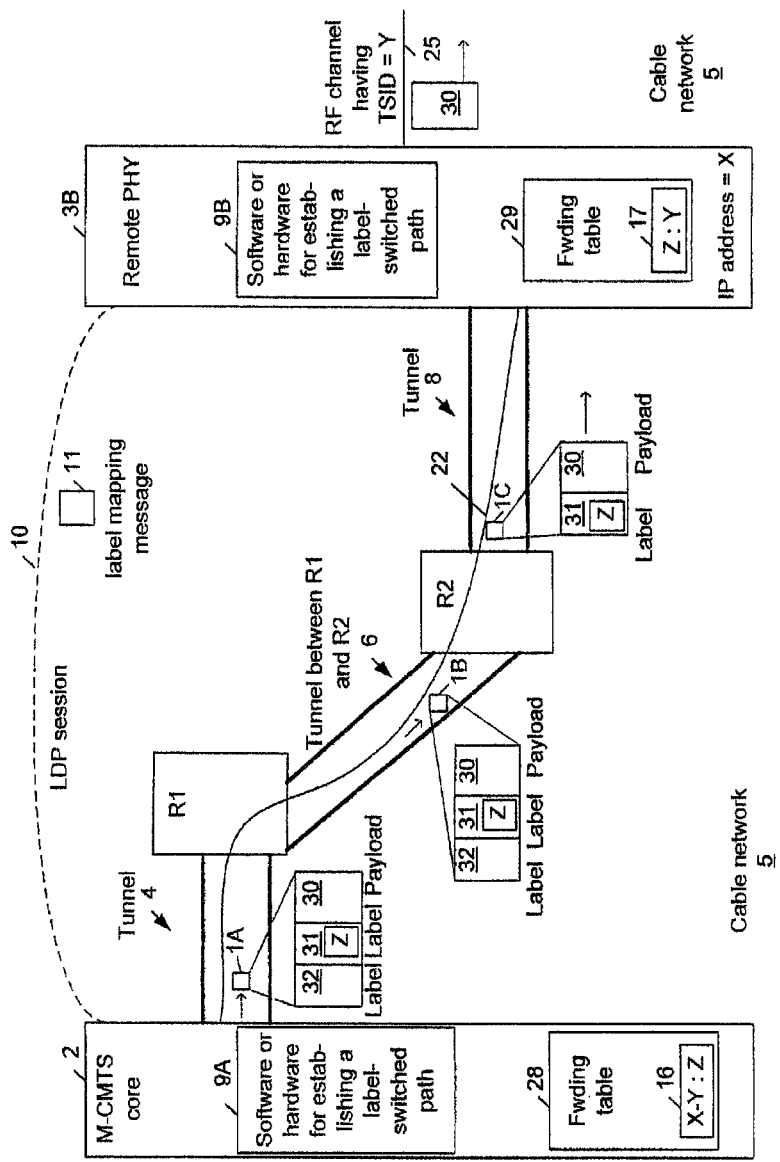
FIG. 1B illustrates an example method for using the M-CMTS core and one of the remote PHYs illustrated in FIG. 1A.

FIG. 1B illustrates an example method for using the M-CMTS core and one of the remote PHYs illustrated in FIG. 1A.

Referring to FIG. 1B, the M-CMTS core 2 establishes a Label Distribution Protocol (LDP) session 10 with the interface 3B to setup one or more logical connections for exchanging communications with the M-CMTS core 2. For brevity, only one LDP session 10 and interface 3B are shown; however, in a typical network the M-CMTS core 2 establishes one LDP session with each remote PHY that includes the software or hardware 9B or 9C. The M-CMTS core 2 and the interface 3B exchange label mapped messages 11 or other signaling over the LDP session 10. These label mapping messages 11 will be described in greater detail with reference to FIGS. 2A-2C.

Referring still to FIG. 1B, the M-CMTS core 2 and the interface 3B use the mapping information negotiated over the LDP session 10 to respectively build label mapping tables 28 and 29. The forwarding table 28 is shown to include only the mapping 16; however, typically the forwarding table 28 would include other mappings (such as mappings for RF channels 23A and 24A in FIG. 1A). Preferably, the mapping 16 uniquely associates the RF channel 25A using both an IP address X for the terminating interface 3B and a value Y corresponding to a channel identifier for RF channel 25A. A Transport Stream Identifier (TSID) value or any other type of value may be used for the channel identifier. Using both an address for a remote PHY and a channel ID value is preferred since more than one remote PHY may use a same channel ID value. Accordingly, the example mapping 16 shown in the forwarding table 28 associates the label Z with the IP address X of the interface 3B and the value Y for the channel identifier of the RF channel 25A.

The forwarding table 29 also maps labels to RF channels. For example, the forwarding table 29 includes the mapping 17 associating the label Z with the value Y for the channel identifier of RF channel 25A. For brevity only the mapping 17 is shown in the forwarding table 29; however, in actual systems the forwarding table 29 ordinarily includes more mappings. Certain advantages that will be explained later in greater detail can be realized when there is a one-to-one correspondence between both the labels and the pseudowires to the RF channels. In other examples besides the example shown, each pseudowire may have two or more sessions and each session may correspond to one label and one RF channel such that each pseudowire is associated with groups of RF channels.

In conjunction with formatting the forwarding tables 28 and 29, the M-CMTS core 2 and the interface 3B establish one or more LSPs (such as DOCSIS pseudowire 22) for reaching each other. In some embodiments, the LSPs may be established using tunnels created under the IP network layer. A single tunnel may extend from the M-CMTS core 2 to the interface 3B, or a plurality of tunnels may be used for the LSPs. In the present example, a tunnel 4 is established between the M-CMTS core 2 and the ingress label switched router R1, a tunnel 6 is established between the router R1 and the egress label switched router R2, and a tunnel 8 is established between router R2 and interface 3B. When the LSPs are tunneled, tunnels may be used as links between network devices while pseudowires are used end to end; however, traffic for more than one pseudowire may be forwarded through each tunnel.

After the forwarding tables 28 and 29 have been formatted and the DOCSIS pseudowire 22 established, the M-CMTS core 2 and the remote PHY 3B can exchange information between a data network (not shown) and the cable modems (not shown). The M-CMTS core 2 and the remote PHY 3B functioning in the above described capacity may be referred to Provider Edge (PE) devices of the MPLS network.

For example, when the M-CMTS core 2 receives information from a data network and destined for the cable modem, the M-CMTS core 2 first uses any known technique (such as using an address included in the received information) to determine that the interface 3B having IP address X is the interface 3B for reaching the destination endpoint. Then, the M-CMTS core 2 uses any known technique to determine that the channel identifier having the value Y connects the interface 3B to the cable modem. The M-CMTS core 2 then compares the IP address X and the value Y to the forwarding table 28 to identify the label Z. The M-CMTS core 2 then formats the communication 1A including the destination payload 30, an innermost label header 31 including the label Z and one or more outermost label headers such as label headers 32. The outermost label headers such as label headers 32 may also be obtained from the forwarding table 28 or another local forwarding table and include information used for transferring the communication 1A between hops. In other embodiments, the outermost label headers 32 may not be added until the communication 1A reaches the ingress label switched router R1.

The ingress label switched router R1 receives the communication 1A and accesses and formats the outermost label headers 32 as necessary for delivery of the communication 1B to the next hop router R2, which may include popping one outmost label header for swapping with another. In other embodiments, the ingress label switched router R1 adds one or more of the outermost label headers 32.

The egress label switched router R2 receives the communication 1B and observes information included in the label header 32. According to the observed information, the router R2 performs a Penultimate Hop Pop (PHP) and removes the outermost label headers 32 so that only the label header 31 having label Z and the payload 30 remain. Next, the router R2 transfers the communication 1C to the interface 3B.

The interface 3B observes the only remaining label header 31 and compares the label Z to the forwarding table 29 to identify the RF channel 25A having the channel identifier with a value Y. The interface 3B then removes the label header 31 and modulates the payload 30 for transmission over the RE channel 25A to a downstream cable modem. The interface 3B may format or remove other headers (not shown) such as a Downstream External Physical Interfaces (DEPI) header located between the label header 31 and payload 30 before forwarding the payload 30. Information originating from the cable modems and received at the interface 3C for upstream forwarding to the M-CMTS core 2 is handled by the system in a similar fashion.

It should be apparent to one of ordinary skill that in typical systems the interface 3B also receives non-DOCSIS traffic such as native video over UDP traffic from video sources in addition to the exemplary DOCSIS traffic sent from the M-CMTS core 2. Such non-DOCSIS traffic is preferably also received over an MPLS network and also includes labels.

In the above-described example, labels are mapped to pseudowires. However, channel bonding may cause a single logical such as an IP flow to be distributed over more than one physical path. Accordingly, in some examples it may be preferable to map an association between a distributed IP flow and physical ports such as RF channels.

Establishing a plurality of pseudowires through the cable network 5 and between the M-CMTS core 2 and the remote PHYs 3A-C provides more control during traffic engineering than conventional cable networks. For example, a user associated with the M-CMTS core 2 is able to fine tune different routes through the cable network 5 through the establishment of the pseudowires between the hops in the cable network 5. The route shown in FIG. 1B includes two hops, which may be a faster route through the network 5 than another route including three or more hops. A database or other listing can indicate the more efficient routes by label value, which allows a user to easily assign selected data flows to the more efficient route by establishing an LDP session to change the mapping values. This gives the user of the M-CMTS core 2 manual control over each hop for a selected data flow instead of putting the routing decisions to automated router algorithms. A user associated with a video stream originating outside the cable network 5 can similarly use MPLS Traffic Engineering (TE) for transferring native video to the remote PHY 3B.

Figure 2A:
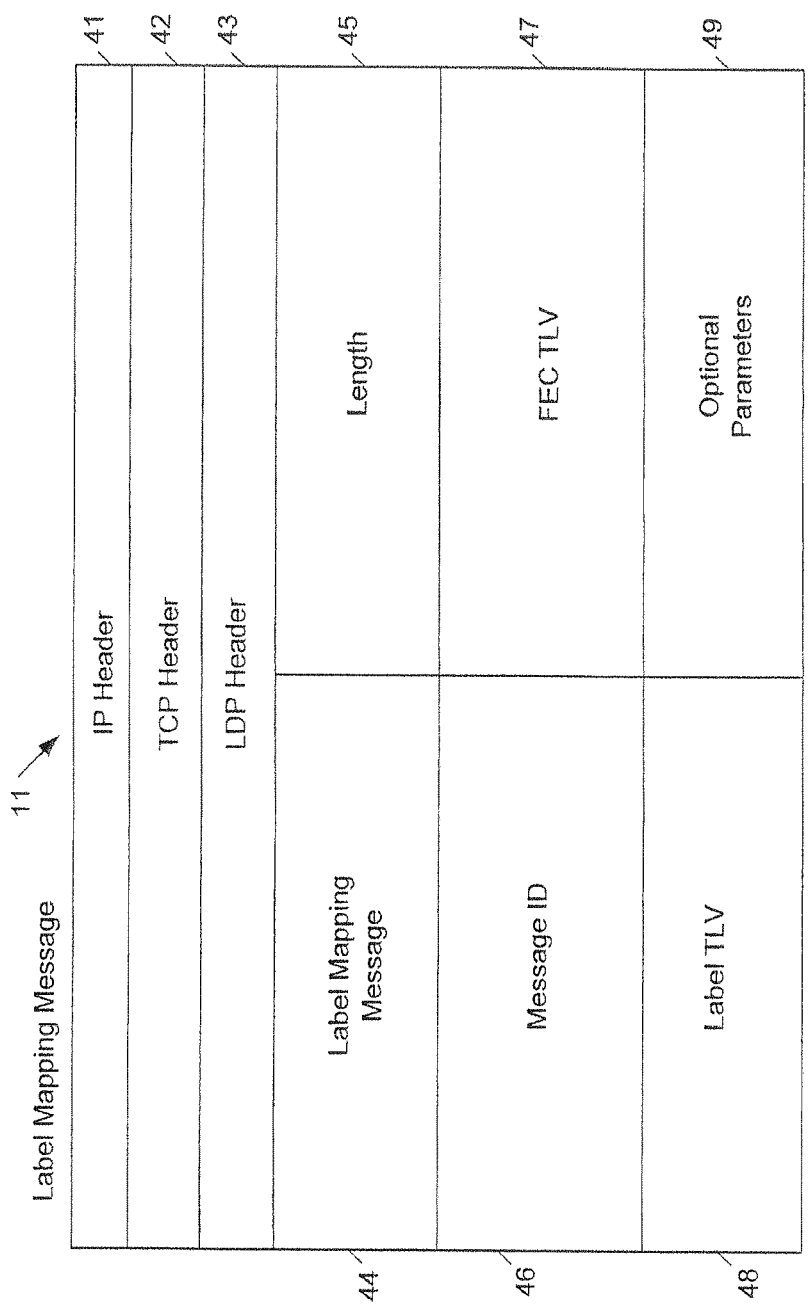
FIG. 2A illustrates an example label mapping message that may be used to build the forwarding tables used by the M-CMTS core and the remote PHYs illustrated in FIGS. 1A and 1B.

FIG. 2A illustrates an example label mapping message that may be used to build the forwarding tables used by the M-CMTS core and the remote PHYs illustrated in FIGS. 1A and 1B.

The label mapping message 11 used to negotiate mappings during the LDP session includes headers such as an IP header 41, a TCP header 42 and an LDP header 43. A label mapping message field 44 may be used to indicate that a proposed mapping sent from one PE device is accepted or rejected by the other PE device. The label mapping message 11 may also include a length field 45 and a message identifier field 46.

The Forwarding Equivalence Class (FEC) Type-Length-Value (TLV) field 47 is used to specify several parameters that characterize both the interface and the QAM channel (RF channel). These parameters are described in greater detail later with references to FIG. 2B. Still referring to FIG. 2A, the label mapping message 11 also includes a label TLV field 48 that is used to specify a label value and which is described in further detail with reference to FIG. 2C. The label mapping message 11 may also include an optional parameters field 49 used for specifying optional information such as, in some embodiments, pseudowire priority. Other fields may be included in the label mapping message 11 but are not shown for brevity.

Figure 2B:
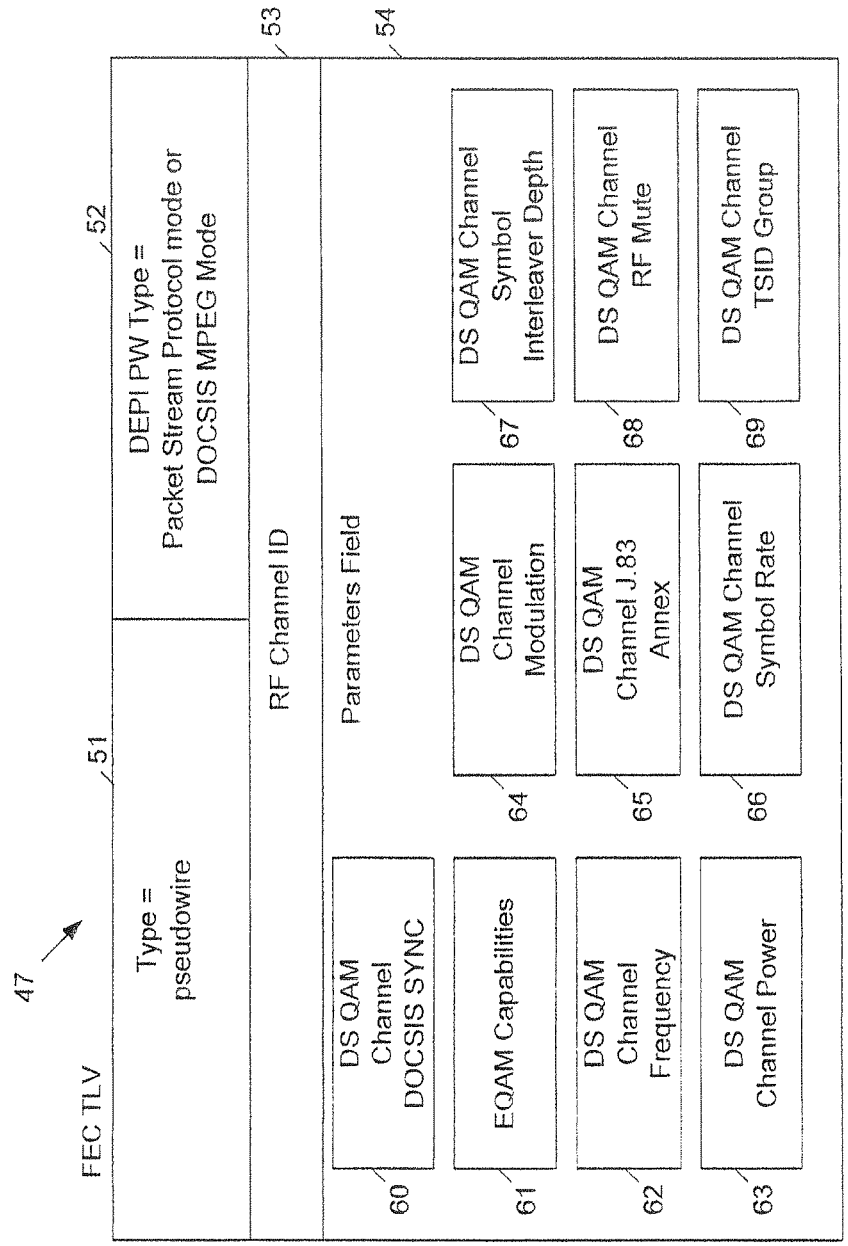
FIG. 2B illustrates an example of a Forwarding Equivalence Class (FEC) Type-Length-Value (TLV) field that may be included in the label mapping message illustrated in FIG. 2A.

FIG. 2B illustrates an example of a Forwarding Equivalence Class (FEC) Type-Length-Value (TLV) field that may be included in the label mapping message illustrated in FIG. 2A.

The FEC TLV field 47 includes a type field 51 and an RF channel field 53. The RF channel field 53 can be used to indicate a TSID value or other identifier for an associated RF channel.

The FEC TLV field 47 also includes a Downstream External Physical Interfaces (DEPI) pseudowire type field 52. In the present embodiment, the DOCSIS pseudowire type indicates either a DEPI-MPLS DOCSIS MPEG Packet Transport (D-MPT) mode or a DEPI-MPLS DOCSIS Packet Stream Protocol (PSP) mode. When the PSP mode is indicated, the signaling message establishes an LSP that is priority-oriented. Packets traveling over one session in the priority-oriented LSP can indicate different priority levels to intermediary devices on the path than different packets transferred over a different session in the priority-oriented LSP. In the PSP mode, the packets exchanged over the LSP include an MPLS header having an EXPerimental (EXP) field that is utilized to indicate priority for these packets.

When the D-MPT mode is indicated, the established LSP has priority with respect to the network. However, within the established LSP all traffic is sent at the same priority.

The parameters field 54 of the FEC TLV is used to communicate several other parameters used by the two PE devices to establish the logical connection and the label-to-channel association. Although only the parameters 60-69 are shown, it will be understood that other parameters such as a Remote UDP port and Local UDP port may be included in the parameters field 54 in other embodiments. Also, other fields may be included in the FEC TLV field 47 but are not shown for brevity.

The DownStream (DS) QAM channel DOCSIS SYNChronize (SYNC) field 60 is used to control whether the remote PHY transmits a DOCSIS SYNC message and whether the remote PHY modifies timestamp values in DOCSIS SYNC messages. The Edge Quadrature Amplitude Modulation (EQAM) capabilities field 61 is used to indicate packet processing capabilities of the remote PHY such as what types of DEPI Latency Measurement (DLM) packets the remote PHY supports. The DS QAM channel frequency field 62 is used to specify the downstream frequency of the RF channels. The DS QAM channel power field 63 indicates how much transmit power is used in transmission over the RF channels.

The DS QAM channel modulation field 64 indicates the type of modulation used by the remote PHY, such as sixty-four (64) constellation QAM or two-hundred and fifty-six (256) constellation QAM. The DS QAM channel J.83 annex field 65 indicates forward error correction settings to be used on the RF channels. The DS QAM channel symbol rate field 66 may be used to indicate whether the remote PHY includes variable symbol rate capability.

The DS QAM channel symbol interleaver depth field 67 may be used to indicate the interleaver depth value of the RF channel. The DS QAM channel RF mute field 68 may be used to control whether an RF output of the QAM channel is muted. The DS QAM channel TSID group field 69 may be used to indicate what TSID group identifier is used for the TSID values assigned by the remote PHY.

FIG. 2C illustrates an example of a Label TLV field that may be included in the label mapping message illustrated in FIG. 2A.

The Label TLV field 48 in the present embodiment includes a label type field 71, a length field 72, a reserved field 73 and a label value field 73. The label value field 73 indicates the label value, such as label value Z (FIG. 1B), to be associated with a QAM channel. The label value selected may numerically correspond to the TSID of the QAM channel to simplify debugging and for other reasons.

Figure 3:
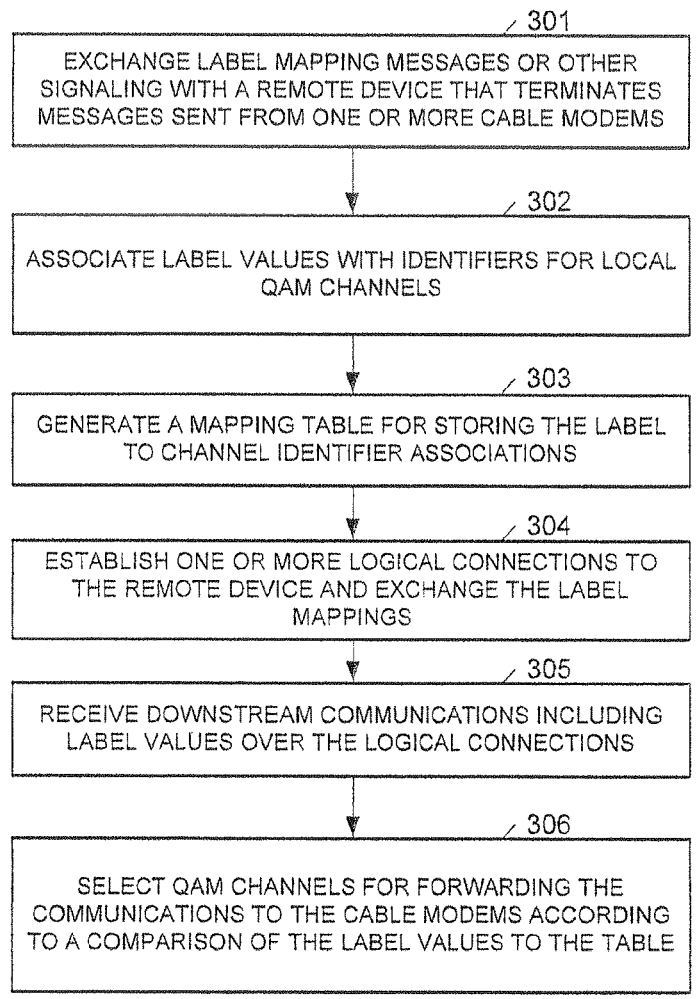
FIG. 3 illustrates an example method for using one of the remote PHYs illustrated in FIGS. 1A and 1B for sending traffic in the downstream direction.

FIG. 3 illustrates an example method for using one of the remote PHYs illustrated in FIGS. 1A and 1B for sending traffic in the downstream direction.

In block 301, the remote PHY exchanges label mapping messages or other signaling with a remote device such as an M-CMTS core that terminates messages sent from one or more cable modems. Preferably this exchange is initiated by the remote device, which has the CM state awareness. The remote PHY associates label values with identifiers for local QAM channels in block 302. In block 303, the remote PHY generates a mapping table for storing the label-to-channel identifier associations. The remote PHY also establishes one or more logical connections to the remote device and exchanges the label mappings in block 304.

In block 305, the remote PHY receives labeled downstream communications over the logical connections. The remote PHY selects QAM channels for forwarding the communications to the cable modems according to a comparison of their label values to the mapping table in block 306. The labels, as well as an MPLS or other header, are removed before forwarding the modulated downstream communications over the selected QAM channels.

Figure 4:
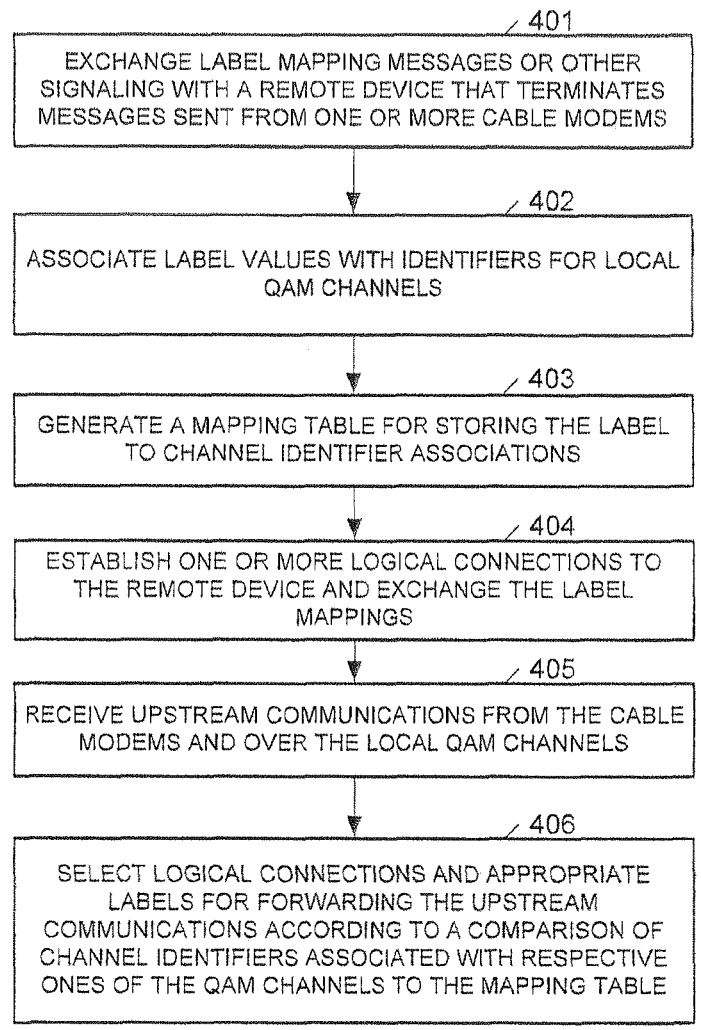
FIG. 4 illustrates an example method for using a different one of the remote PHYs illustrated in FIG. 1A for sending traffic in the upstream direction.

FIG. 4 illustrates an example method for using a different one of the remote PHY illustrated in FIG. 1A for sending traffic in the upstream direction.

In block 401, the remote PHY exchanges label mapping messages or other signaling with a remote device such as an M-CMTS core that terminates messages sent from one or more cable modems. Preferably this exchange is initiated by the remote device, which has the CM state awareness. The remote PHY associates label values with identifiers for local QAM channels in block 402. In block 403, the remote PHY generates a mapping table for storing the label-to-channel identifier associations. The remote PHY also establishes one or more logical connections to the remote device and exchanges the label mappings in block 404.

In block 405, the remote PHY receives upstream communications from remote cable modems over the local QAM channels. The remote PHY selects logical connections and appropriate label for forwarding the upstream communications according to a comparison of channel identifiers associated with respective ones of the QAM channels to the mapping table in block 406. The appropriate labels, as well as an MPLS or other header, are added before forwarding the demodulated upstream communications over the selected logical connections.

Figure 5:
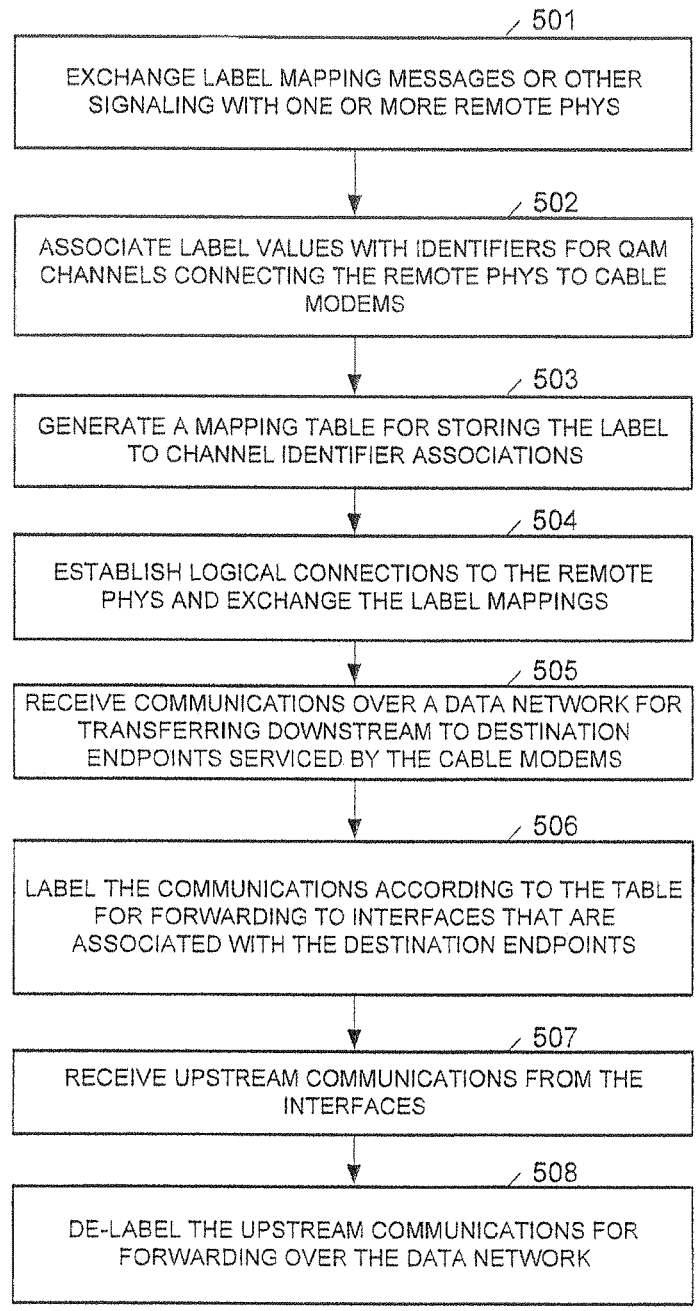
FIG. 5 illustrates an example method for using the M-CMTS core illustrated in FIGS. 1A and 1B.

FIG. 5 illustrates an example method for using the M-CMTS core illustrated in FIGS. 1A and 1B.

In block 501, the M-CMTS core exchanges label mapping messages or other signaling with one or more remote PHYs. The remote PHYs may be DEPIs, EQAMs or any other device. The M-CMTS core associates label values with identifiers for QAM channels that connect the remote PHYs to cable modems in block 502. In block 503, the M-CMTS core generates a mapping table for storing the label-to-channel identifier associations. The M-CMTS core also establishes logical connections to the remote PHYs and exchanges the label mappings in block 504.

In block 505, the M-CMTS core receives communications over a data network for transferring downstream to destination endpoints serviced by the cable modems. The M-CMTS core labels the communications according to the table for forwarding to interfaces that are associated with the destination endpoints in block 506.

In block 507, the M-CMTS core receives upstream communications from the interfaces. The M-CMTS core pops labels from the communications (or otherwise de-labels the communications) for forwarding over the data network in block 508.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A PHYsical layer (PHY) device, comprising:
   one or more processors; and
   a memory coupled to the processors comprising instructions executable by the processors, the processors operable when executing the instructions to:
   conduct a label distribution session between the PHY device and a remote Media Access Control (MAC) device, wherein the PHY device and the remote MAC device comprise a Cable Modem Termination System (CMTS);
   establish a label switched path with the remote MAC device for receiving communications destined for one or more cable modems; and use the label distribution session to associate the label switched path with a data path that extends from the PHY device over a cable network.

2. The PHY device of claim 1 wherein the label switched path operates according to a Packet Stream Protocol (PSP) mode that designates different priorities for sessions associated with the label switched path.

3. The PHY device of claim 1 wherein the label switched path operates according to a Data Over Cable Service Interface Specification (DOCSIS) Moving Pictures Experts Group (MPEG) Packet Transport (D-MPT) mode.

4. The PHY device of claim 1, wherein the data path is established over at least one Quadrature Amplitude Modulation (QAM) channel, and the processors are further operable to exchange at least one Label Distribution Protocol (LDP) message during the label distribution session, the LDP message identifying capabilities of both the PHY device and the QAM channel.

5. The PHY of claim 4 wherein the LDP message includes a Forwarding Equivalence Class (FEC) Type-Length-Value (TLV) field that identifies the capabilities of both the PHY device and the QAM channel.

6. The PHY of claim 4 wherein the LDP message identifies a QAM channel frequency and a transmit power amount used for the QAM channel.

7. The PHY of claim 4 wherein the LDP message identifies a modulation algorithm used by the PHY device to modulate downstream messages.

8. The PHY of claim 4 wherein the LDP message indicates when the QAM channel is configured with a muted Radio Frequency (RF) output.

9. The PHY of claim 1 wherein the processors are further operable to:
  associate a label with the label switched path;
  associate the PHY device with the label; and
  associate a QAM channel extending from the PHY device with the label.

10. A system comprising:
  means for conducting a label distribution session with a remote Media Access Control (MAC) device of a Cable Modem Termination System (CMTS) and establishing a label switched path with the MAC device for receiving communications destined for one or more cable modems; and
  means for using the label distribution session to associate the label switched path with a data path extending from the system over a cable network.

11. The system of claim 10 wherein the label switched path is established over a Downstream External Physical Interface (DEPI) and the data path is established over Hybrid Fiber Coax (HFC) cabling.

12. The system of claim 10 wherein the label distribution session associates the data path with a distributed Internet Protocol (IP) flow established between the remote MAC device and the system.

13. The system of claim 10 wherein the data path is a Quadrature Amplitude Modulation (QAM) channel that couples the system to the cable modems.

14. The system of claim 13 wherein the label switched path comprises a pseudowire and the system is further operable to:
  identify a channel identifier value for the QAM channel; and
  select a pseudowire label value for the pseudowire to numerically correspond with the identified channel identifier value.

15. The system of claim 14 wherein the pseudowire label correlates one of a plurality of pseudowire sessions with the QAM channel.

16. A method comprising:
  conducting, using a PHYsical layer (PHY) device, a label distribution session with a remote Media Access Control (MAC) device of a Cable Modem Termination System (CMTS);
  establishing, using the PHY device, a label switched path with the remote MAC device for communicating with one or more cable modems; and
  using the label distribution session to associate the label switched path with a cable network data path that extends from the PHY device over a cable network.

17. The method of claim 16 wherein the label distribution session associates the data path with a distributed Internet Protocol (IP) flow established between the PHY device and the MAC device.

18. The method of claim 16 further comprising establishing one or more layer two tunnels for the label switched path, the tunnels for receiving communications from the remote MAC device.

* * * * *